United States Patent [19]

Nakagawa

[11] 4,330,187
[45] May 18, 1982

[54] SELF-TIMER FOR AUTOMATIC FOCUSING CAMERA

[75] Inventor: Tadashi Nakagawa, Yotsukaido, Japan

[73] Assignee: Seiko Koki Kabushiki Kaisha, Tokyo, Japan

[21] Appl. No.: 183,149

[22] Filed: Sep. 2, 1980

[30] Foreign Application Priority Data

Sep. 3, 1979 [JP] Japan ................................ 54-112548
Sep. 3, 1979 [JP] Japan ................................ 54-112549

[51] Int. Cl.³ ..................... G03B 13/20; G03B 17/38
[52] U.S. Cl. .................................... 354/195; 354/237
[58] Field of Search .......................... 354/25, 237–240, 354/195–201, 25 A, 25 P, 25 N, 31 F; 352/140

[56] References Cited

FOREIGN PATENT DOCUMENTS 54-115222 9/1979 Japan .................................... 354/25

Primary Examiner—George H. Miller, Jr.
Assistant Examiner—William B. Perkey
Attorney, Agent, or Firm—Robert E. Burns; Emmanuel J. Lobato; Bruce L. Adams

[57] ABSTRACT

A self-timer for the automatic focusing camera capable of automatically determining the focus position of the taking lens provides with a range limiting means prior to automatic range detection in at least a part of the photographing range.

The range limiting means is operated interlocking with the setting of said self-timer to limit the adjustment of the taking lens within a limited range.

13 Claims, 2 Drawing Figures

SELF-TIMER FOR AUTOMATIC FOCUSING CAMERA

BACKGROUND OF THE INVENTION

This invention relates to an improvement of focusing photograph taking lens or simply taking lens of the automatic focusing camera when a self-timer is cooperatively used.

The automatic focusing camera capable of automatically focusing the taking lens by detecting the distance between the camera and an object and generating an electric signal has been widely used owing to its facility, however, the conventional automatic focusing camera has some problems in taking a photograph of the photographer himself cooperatively using a self-timer. In a camera which focuses the taking lens at the moment when the self-timer is started, the range will be incorrectly set if the photographer starts the self-timer standing immediately in front of or behind the camera, while in a camera which focuses the taking lens after the self-timer has been started, the object may not be within the focus detecting area so that the taking lens is likely to be incorrectly focused as, normally, the effective focus detecting area is confined within a very narrow angle.

SUMMARY OF THE INVENTION

Accordingly, an object of the present invention is to provide a range limiting means having priority to the automatic focusing function to operate the same when the self-timer is cooperatively used to limit the taking lens focusing range within a desirable range.

According to the present invention a range limiting means is operated, interlocking with self-timer setting to cancel the incorrect photographing range detected by the automatic focusing system.

DETAILED DESCRIPTION OF THE INVENTION

Figure 1:
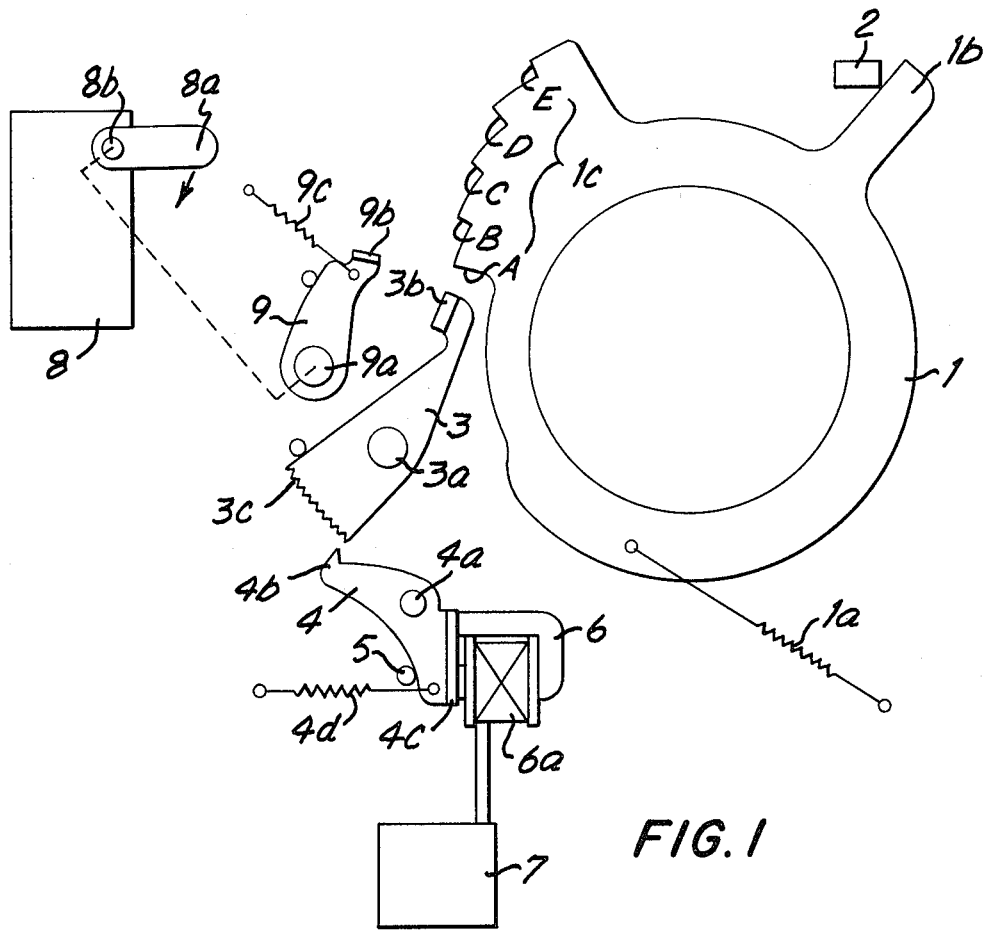
FIG. 1 illustrates a self-timer mechanism according to the present invention for an automatic focusing camera.

Referring now to the attached drawing of FIG. 1, a ring 1 is rotative about the optical axis of the taking lens together with the taking lens and urged counterclockwise by a spring 1a. There are provided for the ring 1 an operating projection 1b and a cam part 1c comprising a cam A corresponding to the infinite range of the taking lens, cam E corresponding to 10 m range of the the taking lens and several cams suitably disposed between the cam A and the cam E.

A setting plate 2, partly shown, is restraining the ring 1 against the spring 1a by engaging with the operating projection 1b in the charged state and adapted to travel leftward in the focusing operation.

An adjusting lever 3 provided with a bend 3b and ratchet 3c is rotative about a shaft 3a and normally resting at the end of its rightward turn as illustrated.

An armature lever 4 provided with a pawl 4b to be engaged with the ratchet teeth 3c and a magnetic part 4c is rotative about a shaft 4a and urged clockwise by a spring 4d. In the charged state as shown, the magnetic part 4c is pressed against an electromagnet 6 against the spring 4d by a pressing member 5.

The electromagnet is magnetized by exciting the coil 6a and controlled by an automatic focus detecting electronic circuit 7.

A self-timer 8 is set by turning a setting member 8a about a shaft 8b in the direction of the arrow and arranged to delay the actuation of the shutter for a period of time after the release button is depressed.

A range limiting means 9 provided with a bend 9b to be engaged with the cam D of the cam part 1c is rotative about a shaft 9a and urged counterclockwise by a spring 9c and resting on a fixed pin 9d. In the state as shown, the bend 9b is retracted from the operating range of the cam part 1c. The range limiting means 9 is turned clockwise about the shaft 9a against the spring 9c interlocking with the turning of the setting member 8a in the direction as shown by the arrow to project the bend 9b into the operating range of the cam D.

In operation, as the release button is depressed starting from the state as shown, the electronic circuit 7 is actuated to excite the coil 6a so that the magnetic part 4c is attracted by the electromagnet 6.

Sequently, the pressing member 5 is retracted leftward so that the armature lever 4 is controlled by the electromagnet 6 under the action of the spring 4d. At the same time, the adjusting lever 3 is allowed to turn counterclockwise about the shaft 3a cooperating with the circuit 7. When a focus detection signal is generated by the electronic circuit 7, the electric current supplied to the coil 6a is cut off to unmagnetize the electromagnet 6 so that the armature lever 4 is turned clockwise by the spring 4d about the shaft 4a and the pawl 4b engages with a tooth of the ratchet teeth 3c to stop the adjusting lever 3.

According to the successive release operation, the setting plate 2 is allowed to move leftward, the operating projection 1b follows the setting plate 2 so that the ring 1 is turned counterclockwise by the spring 1a about the optical axis of the taking lens until one of the cams of the cam part 1c engage with the bend 3b. Thus the taking lens is focused.

At the end of leftward movement of the setting plate 2, the shutter, not shown, is operated to perform exposure.

In recharging the system, the shutter, not shown, is recharged interlocking with the film winding operation, the setting plate 2 is moved rightward to turn the ring 1 clockwise against the spring 1a about the optical axis of the taking lense by pushing the ring 1 at the operating projection 1b, while the pressing member 5 turns the armature lever 4 counterclockwise about the shaft 4a against the spring 4d so that the magnetic part 4c is pressed against the electromagnet 6 thus completing the recharging operation.

When the setting member 8a is turned in the direction as shown by the arrow to use the self-timer 8, the range limiting means 9 is turned clockwise about the shaft 9a against the spring 9c so that the bend 9b projects into the operating range of the cam D.

When the release button is depressed in this state, the adjusting lever 3 is actuated to turn, then stopped at a focus position under the control of the electromagnet and the electronic circuit 7, however, incorrect focusing results if the photographer himself starts the releasing operation standing immediately in front of the camera. The taking lens will be incorrectly focused to an extremely near range if the bend 9b of the range limiting means 9 is not provided. The bend 9b limits the excessive counterclockwise turning of the ring 1 to prevent the taking lens from being focused at an incorrectly near range. Sequently, the movement of the setting plate 2 is delayed by the self-timer 8 and after a period of time, the setting plate 2 is allowed to move leftward further to actuate the shutter thus completing exposure.

The range limiting means 9 can be adapted to limit the infinite range focusing of the taking lens by forming the cams A and E to correspond to 10 m range and infinite range respectively and forming the rest of the cams suitably between the cams A and E. Then the incorrect infinite range setting of the taking lens, which is likely to occure when the photographer operates the shutter button standing behind the camera using the self-timer, is prevented.

If the bend 9b is provided at a position corresponding to the common focus position of the taking lens, the taking lens will be focused to objects at any focusing conditions.

In a modification, instead of providing the bend 9b corresponding to the cam part 1c, the electronic circuit 7 may be provided with a range limiting function which is actuated by operating the range limiting means 9 to control the adjusting lever 3 to make range limiting operation instead of the bend 9b.

The setting of the bend 9b may be for limiting the adjustment of the taking lens within a fixed range, beyond a fixed range or to a common focus range depending on the type or purpose of usage of the camera.

According to the present invention, a range limiting means is actuated interlocking with self-timer setting operation in taking a photograph using the self-timer to limit the focusing range of the taking lens, therefore, such problems as described in the beginning of the description are solved and successful photographing is assured.

The range limiting means may be provided with both functions to limit the focusing of the taking lens beyond a fixed range and within a fixed range.

Figure 2:
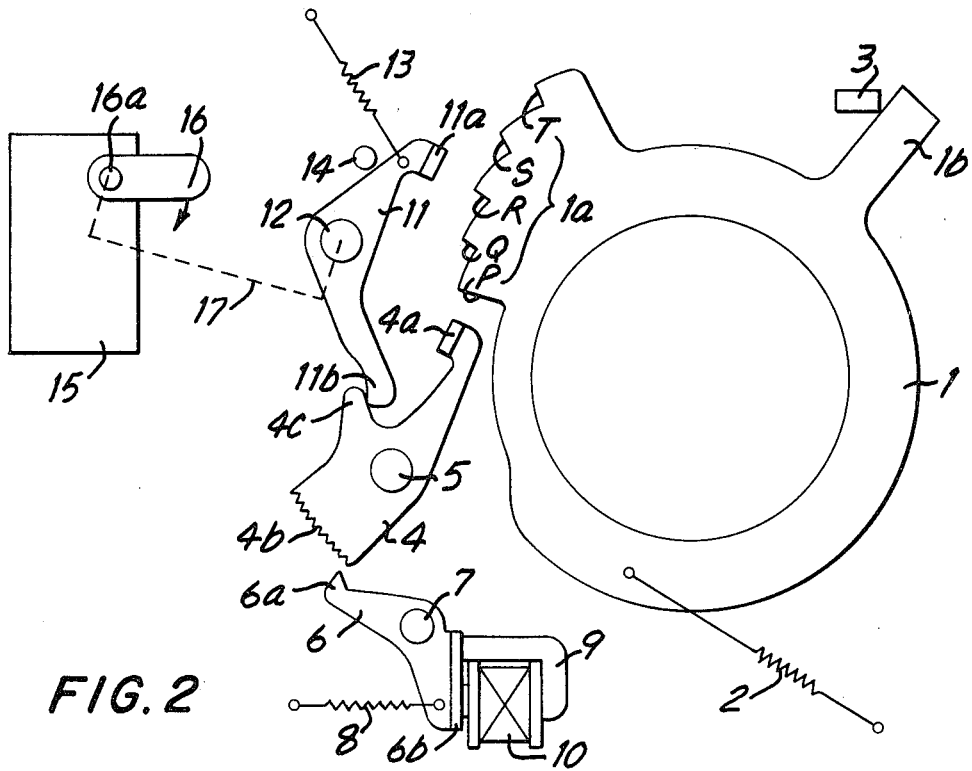
FIG. 2 illustrates a second embodiment of the self-timer mechanism according to the present invention.

Referring to the attached drawing of FIG. 2, a taking lens adjusting ring 1 provided with a cam part 1a including cams P, Q, R, S and T and a projection 1b is adapted to turn about the optical axis of the taking lens and urged counterclockwise by a spring 2. The cams P, Q, R, S and T correspond to respective photographing ranges.

A setting member 3 is put against the projection 1b in the charged state and adapted to travel leftward interlocking with shutter release operation.

An automatic focusing member (AF member hereinafter) 4 having a bend 4a, ratchet teeth 4b and a projection 4c is adapted to turn about a shaft 5 interlocking with the focus scanning operation and normally urged clockwise.

An armature lever 6 having a pawl 6a to be engaged with the ratchet teeth 4b and a magnetic part 6b is rotative about a shaft 7 and urged clockwise by a spring 8. In the charged state, the magnetic part 6b is put against an electromagnet 9.

The coil 10 of the electromagnet 9 is connected to a focus detecting electronic circuit, not shown.

A cancelling means 11 having a bend 11a to be engaged with the cam part 1a and an arm 11b to be engaged with the projection 4c is rotative about a shaft 12, urged counterclockwise by a spring 13 and stopped by a fixed pin 14.

A self-timer 15 is provided with a setting lever 16 which is rotative about a shaft 16a in the direction as shown by the arrow and normally remains in the state as illustrated. The self-timer 15 is operated in the known procedure, therefore, detailed description will be omitted. The shaft 16a is interlocked with the shaft 12 by a known means 17.

In operation, starting from the charged state as illustrated, the AF member 4 is turned counterclockwise about the shaft 5 interlocking with the focus detecting operation and at the same time electricity is supplied to the coil 10 so that the armature lever 6 is attracted to the electromagnet 9 and subsequently the pressing on the armature lever 6 against the electromagnet 9 is released.

When the focus position is detected during the turning of the AF member 4, the electricity from the electronic circuit to the coil 10 is cut off so that the spring 8 pulls off the armature lever 6 from the electromagnet 9 to engage the pawl 6a with one of the ratchet teeth 4b thus stopping the AF member 4 with the bend 4a at a position to be engaged with a cam of the cam part 1a which corresponds to the focus position of the taking lens.

Then, the setting member 3 starts moving leftward allowing the projection 1b to follow the setting member 3 so that the ring 1 is turned counterclockwise by the spring 2 until one of the cams of the cam part 1a is engaged with the bend 4a thus adjusting the ring 1, that is the taking lens, to a focus position.

The above-described operation is concerned with the normal operation of the system without using the self-timer. When the self-timer is used, the setting lever 16 of the self-timer 15 is turned in the direction of the arrow, then the cancelling means 11 is turned clockwise against the spring 13 by a known means 17 to push the projection 4c with the arm 11b and to turn the AF member 4 counterclockwise about the shaft 5 so that the bend 4a is retracted from the operating range of the cam part 1a while the bend 11a enters into the operating range of the cam part 1a and stops on the locus of the cam S corresponding to the common focus position of the taking lens.

In the successive photographing operation with the AF member 4 set as described hereinbefore, focus detecting operation starts synchronously with the start of the self-timer, however, the bend 4a is not engaged with the cam part 1a if the armature lever is actuated by the electromagnet 9 at a focus detection signal as the AF member 4 is restrained by the arm 11b.

As the setting member 3 moves leftward further, the ring 1 is turned counterclockwise by the spring 2 until the cam S engages with the bend 11a thus adjusting the taking lens at a position corresponding to the common focus position of the taking lens. The self-timer operates successively and releases the shutter for exposure, then the setting lever 16 and the cancelling means 11 return to respective starting positions.

Although the cancelling means 11 is a mechanical means interlocked with the setting lever 16 in the preferred embodiment as has been hereinbefore described, in a modification, an electrical means may be used instead of the mechanical means in combination with the setting lever 16 to actuate the electromagnet 9 to stop the AF member when the AF member reaches the position corresponding to the common focus position of the taking lens.

The cancelling means, both mechanical and electrical, can be constructed to manually set the taking lens at an optional range by simply providing locking means at plural positions.

According to the present invention, photographs are taken with the taking lens adjusted at the common focus position of the taking lens and the automatic focusing function idle when the self-timer is used irrespectively of the condition of the objects, therefore, incorrect focusing is prevented providing wide availability of the automatic focusing camera.

What is claimed:

1. A self-timer for the automatic focusing camera capable of automatically determining the focus position of the taking lens by detecting the distance between the camera and an object, provided with a range limiting means having priority to automatic range detection in at least a part of the photographing lens range wherein said range limiting means is operated interlocking with the setting of said self-timer to limit the adjustment of the taking lens within a limited range.

2. A self-timer as set forth in claim 1 wherein said taking lens is adjusted to the common focus position when said range limiting means is used.

3. A self-timer as set forth in claim 1 wherein the adjustment of said taking lens is limited within a fixed range when said range limiting means is used.

4. A self-timer as set forth in claim 1 wherein the adjustment of said taking lens is limited beyond a fixed range when said limiting means is used.

5. A self-timer for the automatic focusing camera capable of automatically determining the focus position of the taking lens by detecting the distance between the camera and an object, comprising a self-timer setting member and a cancelling means for cancelling the automatic focus determining function of the camera wherein the automatic focus determining function is cancelled by operating said cancelling means interlocking with the self-timer setting operation of said self-timer setting member and the taking lens is adjusted to a prefixed position.

6. A self-timer as set forth in claim 5, wherein the taking lens can be adjusted to any of plural positions in setting said self-timer.

7. In an automatic focusing camera focusing mechanism for automatically setting camera focus range: automatic focusing means for automatically setting the focusing mechanism to a focused condition; a self-timer operable for self-timing exposure; and focus range limiting means actuated upon operation of said self-timer for setting the focusing mechanism to a predetermined focus range and for rendering said automatic focusing means ineffective to set the focusing mechanism.

8. In an automatic focusing camera focusing mechanism according to claim 7, wherein said focus range limiting means comprises means for setting the focusing mechanism to a common focus range.

9. In an automatic focusing camera focusing mechanism according to claim 7, wherein said focus range limiting means comprises means for setting the focusing mechanism to a focus range value less than a certain predetermined range value.

10. In an automatic focusing camera focusing mechanism according to claim 7, wherein said focus range limiting means comprises means for setting the focusing mechanism to a focus range value greater than a certain predetermined range value.

11. In an automatic focusing camera focusing mechanism according to claim 7, wherein: said automatic focusing means comprises a focusing ring automatically rotatable for focus adjustment, and means for stopping rotation of said focusing ring when a focused condition is sensed; and said focus range limiting means comprises means responsive to actuation of said self-timer for stopping of said focusing ring at a predetermined angular position.

12. In an automatic focusing camera focusing mechanism according to claim 11, wherein: said means for stopping rotation of said focusing ring is comprised of a plurality of cam surfaces on said focusing ring and each corresponding to a respective angular position of said focusing ring; and means comprising a lever rotated to engage a respective one of said cam surfaces when a focused condition is detected to stop rotation of said focusing ring at an angular oosition corresponding to a focused condition; and said focus range limiting means comprises a second lever rotated to engage a predetermined one of said cam surfaces when said self-timer is actuated to stop rotation of said focusing ring.

13. In an automatic focusing camera focusing mechanism according to claim 12; wherein said second lever comprises means for preventing said first lever from rotating when said second lever is rotated in response to actuation of said self-timer.

* * * * *